United States Patent
Tsai

[19]

[11] Patent Number: 6,032,164
[45] Date of Patent: Feb. 29, 2000

[54] METHOD OF PHONETIC SPELLING CHECK WITH RULES OF ENGLISH PRONUNCIATION

[75] Inventor: Huffman C. L. Tsai, Taipei, Taiwan

[73] Assignee: Inventec Corporation, Taiwan

[21] Appl. No.: 08/898,930

[22] Filed: Jul. 23, 1997

[51] Int. Cl.$^7$ .................................................. G06F 9/06
[52] U.S. Cl. .................. 707/533; 707/535; 707/540; 434/167; 704/9
[58] Field of Search .................................. 707/531, 532, 707/533, 534, 535, 5; 345/171; 434/157, 167; 704/259, 9

[56] References Cited

U.S. PATENT DOCUMENTS

| | | | |
|---|---|---|---|
| 4,609,357 | 9/1986 | Clegg | 434/167 |
| 4,833,610 | 5/1989 | Zamora et al. | 707/5 |
| 5,062,074 | 10/1991 | Kleinberger | 707/5 |
| 5,113,342 | 5/1992 | Zamora | 704/9 |
| 5,890,183 | 3/1999 | Fujimoto | 707/540 |
| 5,893,133 | 4/1999 | Chen | 707/535 |
| 5,930,754 | 7/1999 | Karaali et al. | 704/259 |

FOREIGN PATENT DOCUMENTS

| | | |
|---|---|---|
| 2911550 | 11/1996 | Taiwan . |

OTHER PUBLICATIONS

Lucas, S; Damper, B. Acoustics, Speech and Signal Processing ICASSP–91, 1991 International Conference, vol:3732 pp. 509–512 (IEEE Electronic Library), Apr. 14, 1991.

Alignment of Phonemes With Corresponding Orthography, IBM Technical Disclosure Bulletin, vol. 29, Issue 9, pp. 4216–4221, Feb. 1, 1987.

*Primary Examiner*—Anton W. Fetting
*Assistant Examiner*—William L. Bashore
*Attorney, Agent, or Firm*—Pillsbury Madison & Sutro LLP

[57] ABSTRACT

A method of phonetic spelling check is disclosed. The method includes providing a phonetic mapping representing the relationship between letters and corresponding phonetic symbols, wherein each of the letters maps to at least one of the phonetic symbols, and the phonetic mapping is established in accordance with rules of English pronunciation. The letters may include English letters, phonetic alphabets and wild cards. Next, generate phonetic string including the phonetic symbols according to replaceability of the phonetic symbols by separately processing the English letters, phonetic alphabets and wild cards. Finally, filter out a portion of the phonetic strings according to some spelling rules of English language.

12 Claims, 2 Drawing Sheets

METHOD OF PHONETIC SPELLING CHECK WITH RULES OF ENGLISH PRONUNCIATION

BACKGROUND OF THE INVENTION

1. Field of the Invention

The present invention relates to a spelling check, and more particularly to an improved spelling check method or wild card search method for processing words based on their pronounced sounds.

2. Description of the Prior Art

Spelling check is one of important tools in application software, such as word processing, data base, or spreadsheet, whereby to determine the correctness of a word or/and even correct it.

Conventional spelling check tool verifies a word based on its letter combination instead of its sound. For example, if a user types in 'maskito' erroneously instead of 'mosquito', the conventional spelling check tool probably responds by providing 'masking' or 'mascot', but never the desired 'mosquito' provided. Similarly, in another example, if the user enters 'confidanshal' or 'kanfedential' erroneously instead of 'confidential', the conventional spelling check tool could not recognize it.

Users, especially those speaking English as their second language, used to type in a word according to its pronunciation when they could not remember the approximate spell of the word. For example, the user probably types in 'sbend' instead of 'spend', types in 'sdudent' instead of 'student', or types in 'sgool' instead of 'school' because of his or her incorrect pronunciation. For the former two cases, 'spend' or 'student' can be recognized by the conventional spelling check tool due to their similar forms of letter combination. However, for the latter case, 'spool' or 'stool' may be provided by the conventional spelling check tool, but never the desired 'school' provided, due to their different forms of letter combination even though 'sgool' sounds most similarly to 'school'.

Wild card search is one of the search functions in the conventional spelling check tool. However, with the same reason mentioned above in regard to the conventional spelling check, conventional wild card search is also rendered useless if the spelling mistake is made by inputting words with similar sound rather than similar letter combination. For example, 'receipt' could not be recognized by the conventional wild card search if the user enters 'res*t', wherein c in ci sounds the same as s in si.

It is, therefore, desirable to propose an improved spelling check method or wild card search method for processing words based on their pronounced sounds.

SUMMARY OF THE INVENTION

In accordance with the present invention, a method of phonetic spelling check is provided to improve conventional spelling check method or wild card search method, so that words are processed based on their pronounced sounds. In one embodiment, firstly provide a phonetic mapping representing the relationship between letters and corresponding phonetic symbols, wherein each of the letters maps to at least one of the phonetic symbols, and this phonetic mapping is established in accordance with rules of English pronunciation. It is noted that the letters may include English letters, phonetic alphabets, and wild cards. Next, generate phonetic strings including the phonetic symbols according to replaceability of the phonetic symbols by separately processing the English letters, the phonetic alphabets, and the wild cards. Finally, filter out a portion of the phonetic strings according to some spelling rules of English language. In the embodiment of the present invention, the filtering step mentioned above includes:

(a) filtering out the same phonetic symbols in succession until one thereof is left;

(b) changing n to η if n is followed by k or g;

(c) changing ʃ to ʃ if ʃ is preceded by s, and changing kʃ to tʃ if ʃ is preceded by k;

(d) finding the corresponding letters for each of the phonetic strings; and (f) generating additional phonetic strings, each of the additional phonetic strings having similarity in the phonetic symbols thereamong, wherein the additional phonetic strings are generated by deleting consonants in succession one at a time starting from the second of the phonetic symbols of each of the phonetic strings.

DESCRIPTION OF THE PREFERRED EMBODIMENT

Figure 1:
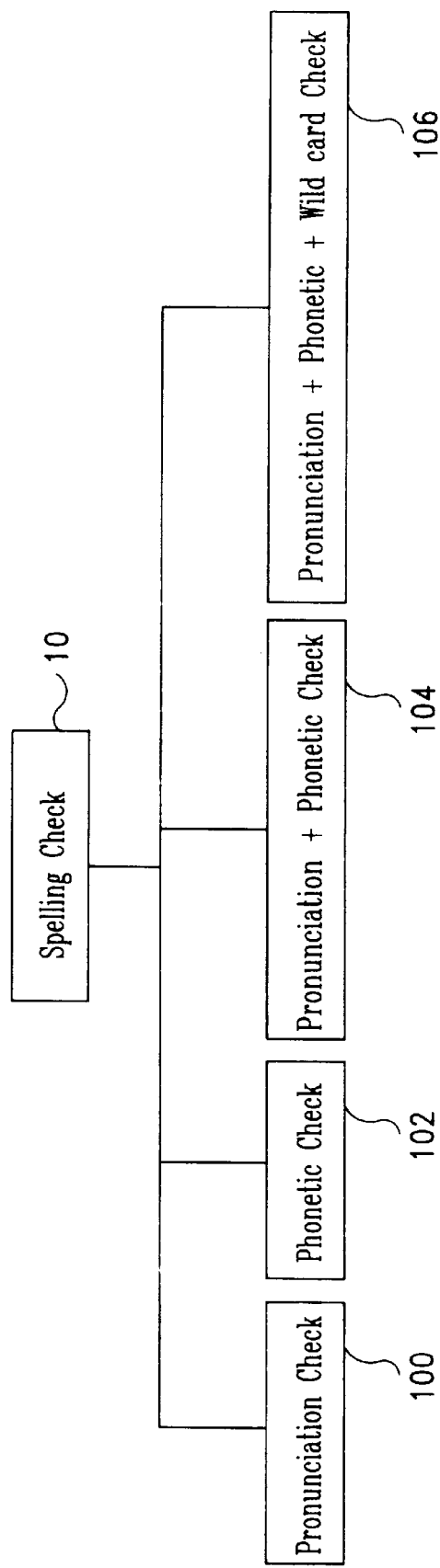
FIG. 1 shows a functional block diagram illustrating one embodiment in accordance with the present invention.

FIG. 1 shows a functional block diagram illustrating one embodiment in accordance with the present invention. For this embodiment, spelling check 10 provides users an improved method of checking words based on rules of pronunciation in English language, phonetic alphabets (or symbols) such as Kenyon & Knott phonetic alphabet, and wild card search. The spelling check 10 includes pronunciation check 100, phonetic check 102, pronunciation/phonetic check 104, and pronunciation/phonetic/wild card check 106.

Figure 2:
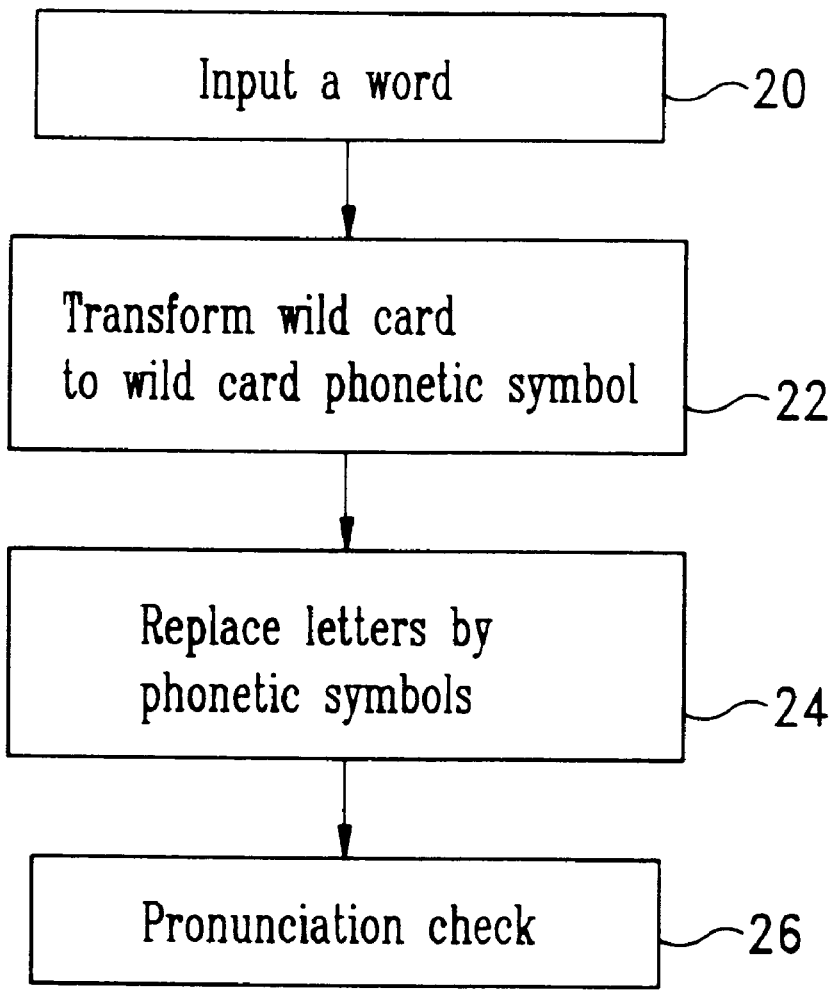
FIG. 2 shows a flow diagram in accordance with the embodiment of the present invention.

FIG. 2 shows a flow diagram in accordance with the embodiment of the present invention. A word string or letter string, which includes letters, wild cards, phonetic symbols, or their combinations, is firstly input in step 20. For example, the spelling check 10 is expected to recognize the word 'abbreviation' when a user enters 'abivi Aʃ*', wherein the abivi is the portion representative of the letters, the Aʃ is the portion representative of phonetic symbols, and * is the wild card. A wild card, such as the * in the aforementioned example, is then transformed into a wild card phonetic symbol or symbols in step 22. In step 24, the portion representative of the letters is replaced by phonetic symbols. Finally, pronunciation check is performed in step 26. It is appreciated that the finctions and method therefor of the blocks in FIG. 1 and FIG. 2 will become apparent after the following disclosure is described in details. It is also appreciated that the order among the blocks shown in FIG. 2 is immaterial. Moreover, although the system of Kenyon & Knott phonetic alphabet is adapted in this embodiment, it is observed, in light of the following disclosure, that other phonetic system can be utilized in the claimed invention.

At the beginning of performing the pronunciation check 100, the pronunciation characteristics of the word to be checked are analyzed according to the following five steps.

Step 1

(1) If all letters are consonants, stop the spelling check.

(2) Delete all non-English letters and symbols except '-'.

(3) Filter out all same consonant letters in concession until one is left. For example, 'apple' is transformed into 'aple', and 'suggest' is transformed into 'sugest'. Items shown in TABLE 1 below are exceptional, that is, those letters are left intact when encountered.

TABLE 1

| cce | hh    | oww  |
|-----|-------|------|
| cci | tth   | sse  |
| ccy | surre | ssi  |
| cch | aww   | nn   |
| lly | eww   | -ess |

Step 2

(1) Provide TABLEs 2A to 2Z in alphabetical order, wherein some specially defined symbols are described below.

A: vowels of æ, I, . . . etc.
O: oI, əI
R: æ, ə
V: vowel
C: consonant
E: segmented string such as -ment, -less, -ly, -ness, . . . etc.)
X: null
P: preceded by a letter or letters
N: followed by a letter (including null) or letters After the corresponding mapping from TABLEs 2A through 2Z, the letters of the checking word are arranged in a format shown below:

A(B,C,D)E(F,G)

where A, B, C, D, E, F, and G are substrings (including null character) of the letters of the checking word, and the substrings in brackets are replaceable.

(2) Expand the letters in the aforementioned format ( i.e., A(B, C, D) E(F, G)) to a full string array that includes all possible strings as shown in TABLE 3 below according to the format.

TABLE 3

| ABEF |
| ABEG |
| ACEF |
| ACEG |
| ADEF |
| ADEG |

Step 3

Further filter the string array generated from step 2.

(1) Filter out all same vowels in succession until one is left.

(2) Change n to η if n is followed by k or g.

(3) If ʃ is preceded by s, then s+ʃ=ʃ; and if ʃ is preceded by k, then k+ʃ=tʃ.

Step 4

Determine the pronunciation of ed.

(1) The ed is pronounced as t, if ed locates at the end of the string, and it is preceded by p, k, s, ʃ, tʃ, θ, and f.

(2) The ed is pronounced as d, if none of the conditions in (1) of the present step is met, and the ed is not preceded by d or t.

(3) The ed is pronounced as Id, if none of the conditions in (1) and (2) of the present step is met.

Step 5

(1) Delete all null characters in the string array.

(2) Find corresponding letters according to their phonetic sting generated from the previous steps.

(3) Elaborate each phonetic string of the string array to generate more possible phonetic strings, which are generated by deleting consonants in succession one at a time starting from the second letter. For example, 'prənauns', a phonetic string transformed from the previous steps and representative of 'pronounce', is elaborated to generate 'pənauns', 'prənaus', and 'prənaun'.

To complete the pronunciation check 100, the following steps (A) to (J) are further performed.

(A) Group vowels into a few groups as shown in TABLE 4 below, wherein corresponding numerals are used as codes specifically in the implementation of the embodiment, and can be modified without departing from the spirit of the present invention.

TABLE 4

| Group A (code 1) |
|---|
| i |
| I |
| e |
| ɛ |
| æ |
| u |
| U |
| a |
| Λ |
| ə |
| aU |
| aI |
| ɑ (is not followed by I) |
| o (is not followed by I) |
| Group R (code 2) |
| ɝ |
| ɚ |
| Group O (code 3) |
| ɔI |
| oI |
| (code 28) |
| I (SPECIAL -ED) |

(B) Similarly, encode consonants as shown in TABLE 5 below.

TABLE 5

| w  | ' code 4  |
| j  | ' code 5  |
| h  | ' code 6  |
| m  | ' code 7  |
| n  | ' code 8  |
| η  | ' code 9  |
| l  | ' code 10 |
| r  | ' code 11 |
| f  | ' code 12 |
| v  | ' code 13 |
| θ  | ' code 14 |
| ð  | ' code 15 |
| s  | ' code 16 |
| z  | ' code 17 |
| ʃ  | ' code 18 |
| b  | ' code 19 |
| p  | ' code 20 |
| d  | ' code 21 |
| t  | ' code 22 |
| g  | ' code 23 |
| k  | ' code 24 |
| 3  | ' code 25 |
| d₃ | ' code 26 |
| tʃ | ' code 27 |
| l  | ' code 10 |

TABLE 5-continued

| | |
|---|---|
| ṃ | ' code 7 |
| ṇ | ' code 8 |
| ʃ (special) | ' code 29 |
| hw | ' code 30 |
| tsw | ' code 31 |

(C) Delete all primary and secondary stressed phonetic symbols.
(D) Delete j if ju (ju) is not in the first syllable.
(E) Delete j if it is preceded by a consonant.
(F) Change æ or ɒ to ɑ if r is preceded by æ or ɒ.
(G) Delete t (code 22) if it is followed by tʃ (code 27).
(H) Change n to η if it is followed by g or k.
(I) ṃ,ṇ,ḷ are respectively changed to æ,ə,ɑif they are not the end of the phonetic string; and ṃ,ṇ,ḷ are respectively changed to m, n, l if they are the end of the phonetic string.

If m, n, or l is preceded by vowel (a, e, i, o, u, y), then they are changed respectively to (æ,ə,ɑor (ṃ,ṇ,ḷ); if m, n, or l is not preceded by vowel (a, e, i, o, u, y), then (ṃ,ṇ,ḷ) can not be used. However, sm is exceptional, that is, sm is changed to zm.

(J) Delete some phonetic symbols in succession until one is left.

For performing the phonetic check 102 (FIG. 1), a phonetic mapping is established according to the pronunciation rule of English as shown in TABLE 6, wherein some specially defined symbols are described below.

A: vowels of æ, I, . . . etc.
O: oI, ɔI
R: æ,ɒ
V: vowel
C: consonant
X: null
P: preceded by a letter or letters
N: followed by a letter (including null) or letters Next, using a method similar to that in the pronunciation check 100, after the mapping from TABLE 6, the letters of the checking word are arranged in a format shown below:

A(B, C, D)E(F, G)

where A, B, C, D, E, F, and G are substrings (including null character) of the letters of the checking word, and the phonetic substrings in brackets are replaceable.

Expand the letters in the aforementioned format (i.e., A(B, C, D)E(F, G)) to a full string array that includes all possible strings as shown in TABLE 7 below according to the format.

TABLE 7

| |
|---|
| ABEF |
| ABEG |
| ACEF |
| ACEG |
| ADEF |
| ADEG |

Thereafter, using a method similar to that in pronunciation check 100 to process the generated phonetic string array by the following steps.

(1) Filter out some phonetic symbols in succession until one is left.
(2) Change n to η if n is followed by k or g.

(3) If ʃ is preceded by s, then s+ʃ=ʃ; and if ʃ is preceded by k, then k+ʃ=tʃ.
(4) Find corresponding letters according their phonetic string generated from the previous steps.

(3) Elaborate each phonetic string of the string array to generate more possible phonetic strings, which are generated by deleting consonants in succession one at a time starting from the second letter. For example, 'prənauns', a phonetic string transformed from the previous steps and representative of 'pronounce', is elaborated to generate 'pənauns', 'prənaus', and 'prənaun'.

For performing the pronunciation/phonetic check 104 (FIG. 1), the pronunciation portion and the phonetic portion are processed separately. For example, a user enters 'abbrivi A ʃione', which is an input representative of 'abbreviation', wherein abbrivi and ione belong to the pronunciation portion (or letter portion), and A ʃ belongs to phonetic portion (or phonetic symbolic portion). More specifically, the pronunciation portions are processed by TABLEs 2A to 2Z and their related described rules, and the phonetic portion is processed by TABLE 6 and its related described rules. The processed portions are then combined, and are expanded according to TABLE 7. For the aforementioned example, the input word is processed as follows:

| | |
|---|---|
| abbrivi | → AbrAvA |
| A | → A |
| ʃ | → (ʃ, ₃,d₃) |
| ion | → An |
| e | → (null ' A) |

The resultant combination becomes AbrAvAA(ʃ, 3, $^d$3) An(null,A). After expanding, possible resulting phonetic strings are as follows:

AbrAvAʃAn,
AbrAvAʃAnA,
AbrAvA₃ₐₙ,
AbrAvA $^d$3AnA,
AbrAvA $^d$3AnA,
ArAvA$^{ʃAn}$,
ArAvAʃAnA,
ArAVA3An,
ArAvA3AnA,
ArAvA $^d$3An,
ArAvA $^d$3AnA,
AbAVA$^{ʃAn}$,
AbAvAʃAnA,
AbAvA3An,
AbAvA3AnA,
AbAvA $^d$3An, and
AbAvA $^d$3AnA, For performing the pronunciation/phonetic/wild card check 106 (FIG. 1), symbol * is used, in this embodiment, as a wild card representing a phonetic symbol or symbols, and symbol ? is used as a wild card representing one phonetic symbol. The primary difference between the pronunciation/phonetic/wild card check 106 and the conventional wild card search is that the wild card in the present invention represents the phonetic symbols or symbols rather than an English letter. Therefore, the rules described hereinbefore can be utilized in the pronunciation/phonetic/wild card check 106. Moreover, there are some possible combinations existed in the pronunciation/phonetic/wild card check 106 as shown below.

1. Pronunciation/wild card search. For example, when the user types in 'buti*', this pronunciation/wild card search is expected to provide 'beaut', 'beauteous', 'beautiful' . . . etc. Further, for example, when the user types in 're?it', the pronunciation/wild card search will provide 'repeat', 'resit', 'receipt', . . . etc.

2. Phonetic/wild card search. For example, 'confidential' is expected to be provided in the phonetic/wild card search when the user enters 'kAn*ʃA'.

3. Pronunciation/phonetic/wild card search. For example, when the user enters 'konfAdAn*', the pronunciation/phonetic/wild card search will provide 'confidence', 'confident', 'confidential', . . . etc.

Although specific embodiments have been illustrated and described, it will be obvious to those skilled in the art that various modifications may be made without departing from the spirit which is intended to be limited solely by the appended claims.

TABLE 2A

| Group A | | |
|---|---|---|
| Xa- | :a | →A |
| XaX | :a | →A |
| XaweE | :awe | →A |
| XawC | :if C1='h' | a→A |
| | else | aw→A |
| Xaw | :aw | →(A,Aw,w) |
| awing | :awing | →Oŋ |
| awi | :awi | →(AwA,O) |
| awh | :awh | →(Ah,Ahw) |
| awyX | :awy | →O |
| CawC | :aw | →A |
| aw | :aw | →(A,Aw) |
| aux | :au | →A |
| air | :air | →Ar |
| areE | :are | →(Ar, ArA) |
| ParE | :ar | →(Ar, R) |
| ParC | : | |
| ParedX | : | |
| CalE (a is not in the first syllable) | :al | →(Al,l) |
| Xay | :ay | →(A, Aj) |
| else | :a | →A |

TABLE 2B

| Group B | | |
|---|---|---|
| Xb- | :b | →bA |
| XbX | :b | →bA |
| bone (not followed by r) | :bone | →(bAn, bAnA) |
| boreC (C1!='r','d') | :bore | →(bAr, bArA) |
| Xbh | :bh | →b |
| Xbd | :bd | →d |
| XbaleN (N1!='r') | :bal | →(bA1, bA1A) |
| XbakeN (N1!='r') | :bak | →(bAk, bAkA) |
| XbaneN (N1!='r') | :ban | →(bAn, bAnA) |
| XbareN (N1!='r') | :bar | →(bAr, bArA) |
| XbaksN (N1!='r') | :bas | →(bAs, bAsA) |
| Pb | :b | →b |
| else | :b | →b |

TABLE 2C

| Group C | | |
|---|---|---|
| Xc- | :c | →sA |
| XcX | :c | →sA |
| PceE (P!='-') | :ce | →s |
| counter N | :if N1='e', count else cunter | →kAnt →kAntR |
| clothes | :clothes | →klAz |
| cci | :cci | →(ksA, tʃA) |
| ccy | :ccy | →(ksA, tʃA) |
| cceN (N1!='r') | :cce | →(ksA, tʃA) |
| ceuse | :ceuse | →sRz |
| ceous | :ceous | →ʃəs |
| cross | :cross | →krAs |
| PciN (N1!='a','e','o','u') | :if P=X, else | c →(ʃ, s) c →(special ʃ,) s) |
| PceN (N1!='a', 'o') | :c | →(s ,ʃ) |
| cN | :c | →s |
| coe | :c | →(s,k) |
| ck | :ck | →k |
| Xchol | :ch | →(k,tʃ) |
| Xchem | :chem | →(kAm, ʃAm) |
| chN (N1!='r' and N!=E and N2!='e', N3!=null ) | :chr | →kr |
| XchN (N1!='l' and N!=E) | :chl | →kl |
| PcN (N1!='h' and N!=E) | :ch | →(k, tʃ,ʃ) |
| ch | :ch | →(tʃ,ʃ,k) |
| Xcze | :cze | →tʃA |
| crew | :crew | →krA |
| Xcre | :cre | →krA |
| cre | :cre | →(krA,kR,kAr) |
| cae | :cae | → sA |
| XcuN (N1!='i','e' ) | :c | → kw |
| XcN (N1!='l','r', and N1=C ) | :c | →NULL |
| Pc | :if previous syllable is k, else | c→NULL c→k |
| else | :c | →k |

TABLE 2D

| Group D | | |
|---|---|---|
| Xd- | :d | →dA |
| XdX | :d | →dA |
| Xdh | :dh | → d |
| Xdj | :dj | →d₃ |
| disch | :disch | →dAstʃ |
| Pdg | :dg | →(d₃ ,dg) |
| Pdia | :d | →(d₃ ,d) |
| dz | :dz | →(d₃ ,dz) |
| duo | :du | →(d₃A ,dA) |
| PdulV | :du | →(d₃A ,dA) |
| Pdu | :d | →(d ,d₃) |
| XdN (N1=C and N1!='r','w') | :d | →NULL |
| PdC (C1!=NULL) | :d | →(d,dA) |
| else | :d | →d |

TABLE 2E

Group E

| | | |
|---|---|---|
| Xe- | :e | →A |
| XeX | :e | →A |
| eer | :eer | →(Ar,AR) |
| ereN (N1!='x' and N=E) | :ere | →Ar |
| Xelse | :else | →Als |
| ee | :ee | →A |
| eN (N1!='r' and N!=E) | :if N2='e', N3='d', N4=E | er→(Ar,R) |
| | else if N2='e', N3!='r', N3=C | ere→(ArA,Ar,RA) |
| | else if N2='s', N3-NULL | |
| | else if N2!=NULL, N2=C | er→(Ar,R) |
| | else | er→(R,Ar) |
| | | er→(R,Ar,r) |
| Xew | :ew | →jA |
| PewN (N1!='h') | :if P=C, N1=C | ew→A |
| | else | ew→(A,Aw,w) |
| Pexu | :ex | →(Akʃ,Aks) |
| earN | :if N1=NULL | ear→(Ar,R,AR) |
| | else | ear→(Ar,R) |
| Xeu | :eu | →jA |
| Peur | :e | →(NULL,A) |
| essE | :ess | →As |
| eauxE | :eaux | →(A, Az) |
| CesE | :if C='t' | es→(Az,As,s) |
| | else | es→(Az,As,z,s) |
| PeE | :if e is in the first syllable, | e →A |
| | else if P='y'or P=C | e→(NULL,A) |
| PedE (e is not in the first syllable) | :ed | →(special Id, Ad) |
| CelE (e is not in the first syllable) | :el | →(Al, l) |
| CeC (e is not in the first syllable) | :e | →(A, NULL) |
| else | :e | →A |

TABLE 2F

Group F

| | | |
|---|---|---|
| Xf- | :f | →Af |
| XfX | :f | →Af |
| fore | :fore | → (fAr,fArA) |
| XfN (N=C and N1!='l','r','j') | :f | →NULL |
| else | :f | →f |

TABLE 2G

Group G

| | | |
|---|---|---|
| Xg- | :g | →d₃A |
| XgX | :g | → d₃A |
| Xgh | :gh | → g |
| gh | :gh | →(f,gh,NULL) |
| guard | :guard | →(gArd, gRd) |
| guerN (N=C or N=E) | :guer | →(gR,gAR) |
| guV | :g | →(gw, d₃) |
| gu | :g | →(g, d₃) |
| XgN (N1!='a','o','u') | :g | →(g, d₃) |
| gV | :g | →(d₃, g, ₃) |
| XgC (C1!='l','r') | :g | →NULL |

TABLE 2G-continued

Group G

| | | |
|---|---|---|
| PgC (C1!=NULL) | :g | →(g, gA) |
| else | :g | →g |

TABLE 2H

Group H

| | | |
|---|---|---|
| Xh- | :h | → Atʃ |
| XhX | :h | → Atʃ |
| PhN (N=NULL or N1!='-') | :h | → NULL |
| hourC | :hour | →Ar |
| half | :half | →hAf |
| Xheir | :heir | →Ar |
| XhonV | :hon | →(hAn, An) |
| -honV | :hon | →(hAn, An) |
| hua | .hua | →(wA, hA) |
| else | :h | →h |

TABLE 2I

Group I

| | | |
|---|---|---|
| Xi- | :i | →A |
| XiX | :i | →A |
| Xisu | :isu | →AsA |
| issue | :issu | →Asa |
| irer | :ir | →Ar |
| ireC | :ire | →(Ar,ArA) |
| ire | :i | →A |
| iron | :iron | →(ArAn ,ARn) |
| ir | :ir | →(Ar ,R) |
| ier | :ier | →(Ar ,AR,R) |
| iard | :iard | →(jRd ,jArd) |
| wi (previous phonetic alphabet is A) | :combination of A and i | →O |
| else | :i | →A |

TABLE 2J

Group J

| | | |
|---|---|---|
| Xj- | :j | →d₃A |
| XjX | :j | → d₃A |
| XjesV | :jes | → (d₃Az, d₃As) |
| Xj | :j | →d₃ |
| else | :j | →(d₃ ,₃ ,j) |

TABLE 2K

Group K

| | | |
|---|---|---|
| Xk- | :k | →kA |
| XkX | :k | → kA |
| Xkn | :kn | → n |
| kh | :kh | →kh |
| XkC (C!='r','v','l','w') | :k | →NULL |
| PkC (C!=NULL) | :k | →(k,kA) |
| else | :k | →k |

TABLE 2L

Group L

| | | |
|---|---|---|
| Xl- | :l | →Al |
| XlX | :l | → Al |
| Xlh | :lh | → l |
| lery | :le | →(lA,Al,AlA) |
| PleC | :if P='c' | le→(l,Al) |
| (P!='-' and C1!='r' and le is not in the first syllable) | else | le→(Al,l) |
| lj | :lj | → l |
| else | :l | → l |

TABLE 2M

Group M

| | | |
|---|---|---|
| Xm- | :m | →Am |
| XmX | :m | →Am |
| Xmision | :mi | →mA |
| XmishC | :mi | →mA |
| Xmis | :mis | →(mAs,mAz) |
| Xmh | :mh | →m |
| Xmn | :m | →NULL |
| Xmc | :mc | →mAk |
| Xmb | :m | →Am |
| else | :m | →m |

TABLE 2N

Group N

| | | |
|---|---|---|
| Xn- | :n | →An |
| XnX | :n | →An |
| Xng | :ng | →Ang |
| PngE | :if P='i', 'o', or E=NULL | ng→η |
| | else | ng→ηg |
| nguN (N=NULL or N1='d', N2=E) | :if N2=NULL or else | ng→ηg ng→η |
| ngs | :ngs | → ηz |
| ng | :n | → n |
| niorX | :nior | →(nR ,nAR) |
| news | :news | →(nAz ,nAs) |
| Pnazi (P=NULL or P='-') | :nazi | →(nAtsA ,nAzA) |
| else | :n | → n |

TABLE 2O

Group O

| | | |
|---|---|---|
| Xo- | :o | →A |
| XoX | :o | →A |
| Xoe | :o | →NULL |
| Pour | :o | →NULL |
| oine | :oin | →(wAn,On) |
| oyC | :oy | →O |
| oy | :oy | → (O,Aj) |
| oirX (o is in the first syllable) | :oir | → Or |
| oir | :oir | →(wAr ,Ar,R) |
| owyX | :owy | →(O ,AwA) |
| owi | :owi | →(O,AwA,,A) |
| owh | :owh | →(Ah ,Awh) |
| CowC | :ow | →A |
| ow | :ow | →(A ,Aw,w) |
| oar | :oar | →(Ar,R) |
| oreE | :ore | →(Ar ,ArA) |

TABLE 2O-continued

Group O

| | | |
|---|---|---|
| or | :or | →(Ar,R) |
| ourE | :our | →(R,Ar) |
| ough | :ough | →(A ,Af) |
| oeyX | :oey | →O |
| oeN (N1!='r') | :oe | →(O,A) |
| oi | :oi | →O |
| XoneE | :one | →wAn |
| Xone | :one | →(wAn ,An) |
| oneE | :one | →(wAn ,An) |
| one | :o | →A |
| Xonce | :once | →wAns |
| XofE | :of | →(Av ,Af) |
| else | :o | →A |

TABLE 2P

Group P

| | | |
|---|---|---|
| Xp- | :p | →pA |
| XpX | :p | →pA |
| Xphth | :phth | →θ |
| phood | :p | →p |
| phorn | :p | →p |
| phole | :p | →p |
| phouse | :p | →p |
| PphV | :ph | →(f,ph) |
| ph | :ph | →f |
| Xpt | :p | →NULL |
| Xpn | :p | →NULL |
| Xpc (C1!='f','l','r') | if C2=C else | p→p p→NULL |
| PpC (C1!=NULL) | :p | →(p,pA) |
| else | :m | →p |

TABLE 2Q

Group Q

| | | |
|---|---|---|
| Xq- | :q | → kA |
| XqX | :q | → kA |
| quV | :qu | → kw |
| quC | :qu | → kA |
| else | :q | →k |

TABLE 2R

Group R

| | | |
|---|---|---|
| Xr- | :r | →Ar |
| XrX | :r | → Ar |
| Xrh | :rh | → r |
| Xrw | :rw | → r |
| CredX | :re | → (rA,R) |
| Pr (P='r') | :r | → NULL |
| CreE (e is not in the first syllable, and C!='-') | :re | →(R,rA) |
| else | :r | → r |

TABLE 2S

Group S

| | | |
|---|---|---|
| Xs- | :s | →As |
| XsX | :s | →As |
| Xsb | :sb | → (zb,sp) |
| Xsd | :sd | →st |
| Xsg | :sg | →sk |
| Xsh | :sh | →∫ |
| sh | :sh | →(∫,sh) |
| Psch (P='Θ') | :s | →s |
| sch | :sch | →(∫,sk) |
| sc | :s | →(s,sk) |
| seuse | :seuse | →sRz |
| XsugV | :s | →(∫,s) |
| ssur | :s | →NULL |
| Xsure | :sure | →(∫Ar,sAr) |
| sure | :sur | →(∫R,∫Ar,₃R) |
| Xsur | :sur | → (sR,sAr) |
| sur | :s | →(s,∫,₃z) |
| suN (N1!='a','o','i' and N1!='e',N2!='r') | :suN1 | →(swA,₃A,∫A) |
| su (previous phonetic alphabet of s is not k) | :s | →(∫,₃,z) |
| su (previous phonetic alphabet of s is k) | :s | →(∫,₃) |
| sier (previous phonetic alphabet of s is not k) | :s | →(∫,₃,z) |
| sier (previous phonetic alphabet of s is k) | :s | →(∫,₃) |
| sia (previous phonetic alphabet of s is not k) | :s | →(s,∫,₃,z) |
| sia (previous phonetic alphabet of s is k) | :s | →(s,∫,₃) |
| XsmE | :s | →s |
| PsmE | :s | →(z,s) |
| sm | :sm | →z |
| Psion | :sion | →(∫An,₃An) |
| PsiE (E!=NULL and i is not in the first syllable) | :si | → (s,z,sA,zA) |
| PseE (E!=NULL and e is not in the first syllable) | :se | → (s,z,sA,zA) |
| XsV | :s | →(s, z) |
| sE | :s | →(s, z) |
| sN (N1!='a','i','o','u','y') | :s | →(s, z) |
| Ps (P1!='a','i','o','u','y') | :s | →(s, z) |
| else | :s | →s |

TABLE 2T

Group T

| | | |
|---|---|---|
| Xt- | :t | →tA |
| XtX | :t | →tA |
| Xtongue | :tongue | →tAη |
| Xtsw | :tsw | →tsw |
| Xts | :ts | →(ts,z) |
| Xth | :th | →(θ, ð,t) |
| thN (N=NULL or N1='-') | :th | → θ |
| th | :th | → (θ, ð,th) |
| tz | :tz | →ts |
| tureE | :ture | →(t∫R,t∫Ar,tAr) |
| ture | :t | →(t∫,t) |
| tsch | :tsch | →(t∫, t+∫) |
| tch | :tch | →(t∫,t) |
| Ptu | :t | →tAp |
| Xtype | :type | →t∫An |
| Ption | :if P='s' tion→t∫An else tion→∫An | |
| PtiN (N1!='a','e','o','u') | :if P='s' else | t→(t∫,t) t→(∫,t) |
| PtC (C1!=NULL) | :t | (t,tA) |
| else | :t | →t |

TABLE 2U

Group U

| | | |
|---|---|---|
| Xu- | :u | →jA |
| XuX | :u | →jA |
| XurC | :ur | →R |
| Xur | :u | →jA |
| Xunkn | :unkn | →An |
| Xuc | :if C2=C or C1='n',C2='e' else | u→(A,jA) u→(jA,A) |
| uoy | :uoy | → O |
| uor | :u | → NULL |
| ureE | :ure | →(Ar,R,jR) |
| urer | :ur | →Ar |
| ures | :ur | →Ar |
| ure | :ur | →(Ar,R,jA) |
| ur | :ur | →(R,Ar,jA) |
| PueE (P='g') | :ue | →(NULL,A) |
| PuedE (P='g') | :ue | →(NULL,A) |
| else | :u | →A |

TABLE 2V

Group V

| | | |
|---|---|---|
| Xv- | :v | →vA |
| XvX | :v | →vA |
| vE | :v | →(v,f) |
| vior | :vior | →(vR,vAr) |
| viour | :viour | →(vR,vAr) |
| Xvice | :vice | →(vAs,vAsA) |
| XvC (C1!='l','r') | :v | →NULL |
| else | :v | →v |

TABLE 2W

Group W

| | | |
|---|---|---|
| Xw- | :w | →dAb1A |
| XwX | :w | → dAb1A |
| wh | :wh | →(wh,h,w) |
| wr | :w | →NULL |
| ward | :ward | →(wArd,wRd) |

TABLE 2W-continued

| Group W | | |
|---|---|---|
| walk | :walk | →wAk |
| else | :w | →w |

TABLE 2X

| Group X | | |
|---|---|---|
| Xx- | :x | →Aks |
| XxX | :x | →Aks |
| XxC | :x | →(Aks, krAs) |
| Xx | :x | →z |
| xion | :xion | →kʃAn |
| xious | :xious | → kʃAs |
| xual | :xual | → kʃAl |
| else | :x | → (ks,gz) |

TABLE 2Y

| Group Y | | |
|---|---|---|
| Xy- | :y | →wA |
| XyX | :y | →wA |
| XyC | :y | →(A, j) |
| Xy | :y | →j |
| yrC | :yr | →(R, Ar) |
| yV | :y | → (j, A) |
| else | :y | → A |

TABLE 2Z

| Group Z | | |
|---|---|---|
| Xz- | :z | →zA |
| XzX | :z | →zA |
| Xzw | :zw | →tsw |
| Xzinc | :zinc | →(zAηk,zAns) |
| zue | :zue | →zwA |
| Pzu | :if previous phonetic alphabet of z is k, else | z→($_3$,s) z→($_3$,z) |
| Pzier | :if previous phonetic alphabet of z is k, else | z→($_3$,s) z→($_3$,z) |
| XzV | :z | →(z,s) |
| Pz (previous phonetic alphabet of z is k) | :z | → s |
| else | :z | → z |

TABLE 6

| phonetic alphabet | phonetic string | substituted string | after substitution |
|---|---|---|---|
| w | XwV | w | (w,hw) |
|   | wh | wh | (hw,w,h) |
|   | wr | w | null |
| j | Cj | j | null |
|   | PjA | j | null |
| h | Xhw | hw | (hw,w) |
|   | PhN | h | null |
|   | (N=null or N1='-') | | |
| m | Cm | m | (m,Am) |
|   | Xmh | mh | m |
|   | Xmn | m | null |
|   | Xmc | mc | mAk |
|   | Xmb | m | Am |
| n | Cn | n | (n,An) |
|   | Xng | ng | Ang |
|   | PngE | ng | η |
|   | Png | ng | (ng,η) |
| l | Xlh | lh | l |
|   | ClX | l | (l,Al) |
| r | Rr | Rr | (Ar,R) |
|   | Xrh | rh | r |
|   | Xrw | rw | r |
| f | XfN (N=C and N1!='l', 'r') | f | null |
| v | vE | v | (v,f) |
|   | XvC (C1!='l','r') | v | null |
| θ | Xθ | θ | (θ,ð,t) |
|   | θ | θ | (θ,ð) |
| ð | ð | ð | (ð,θ,t) |
|   | ð | ð | θ |
|   | ð | ð | (ð,θ) |
| s | Xsb | sb | (zb,sp) |
|   | Xsd | sd | st |
|   | Xsg | sg | sk |
|   | Xsh | sh | ʃ |
|   | sh | sh | (ʃ,sh) |
|   | XsmE | s | s |
|   | PsmE | s | (z,s) |
|   | sm | sm | z |
|   | XsV | s | (s,z) |
|   | sE | s | (s,z) |
|   | sN (N1=vowel) | s | (s,z) |
|   | Ps (P!=vowel) | s | (s,z) |
| z | XzV | z | (z,s) |
|   | kz | z | s |
|   | Xzw | zw | tsw |
| ʃ | Pʃ | ʃ | (ʃ,₃,d₃) |
|   | ʃ | ʃ | (ʃ,tʃ) |
| b | Xbh | bh | b |
|   | Xbd | bd | d |
|   | Pb | b | b |
|   | PbC (C1!=null) | b | (b,bA) |
| p | PphV | ph | (f,ph) |
|   | ph | ph | f |
|   | Xpt | p | null |
|   | Xpn | p | null |
|   | XpC if C2=C (C1!='f','l','r') else | p | p null p |
|   | PpC (C1!=null) | p | (p,pA) |
| d | Xdh | dh | d |
|   | Pdg | dg | (d₃,dg) |
|   | dz | dz | (d₃,dz) |
|   | XdN (N1=C and N1!='r', | d | null |

TABLE 6-continued

| phonetic alphabet | phonetic string | substituted string | after substitution |
|---|---|---|---|
| | 'w') PdC (C1!=null) | d | (d,dA) |
| t | Xts | ts | (ts,z) |
| | Xth | th | (θ,ð,t) |
| | thN (N=null or N1='-') | th | θ |
| | th | th | (θ,ð,th) |
| | tz | tz | ts |
| | PtC (C1!=null) | t | (t,tA) |
| g | Xgh | gh | g |
| | gh | gh | (f,gh,null) |
| | XgV | g | (g, d₃) |
| | gV | g | (d₃,g,3) |
| | XgC (C1!='l','r') | g | null |
| | PgC (C1!=null) | g | (g,gA) |
| k | Xkn | kn | n |
| | kh | kh | kh |
| | XkC (C!='r','v','l','w') | k | null |
| | PkC (C1!=null) | k | (k,kA) |
| 3 | P₃ (P!=null) | 3 | (₃, d₃) |
| | 3 | 3 | (₃, d₃, ʃ) |
| d₃ | P d₃ (P!=null) | d₃ | (d₃,₃) |
| | d₃ | d₃ | (d₃,₃,ʃ) |
| tʃ | tʃ | tʃ | (tʃ,ʃ) |
| l. | xl. | l. | l. |
| | cl. | l. | Al |
| | l. | l. | l. |
| m. | xm. | m. | m. |
| | Cm. | m. | Am |
| | m. | m. | m. |
| n. | Xn. | n. | n. |
| | Cn. | n. | An |
| | n. | n. | n. |

What is claimed is:

1. A method of phonetic spelling check, comprising:

providing a phonetic mapping representing the relationship between a plurality of letters and corresponding phonetic symbols, wherein each of said plurality of letters maps to at least one of said phonetic symbols, said phonetic mapping being established in accordance with rules of English pronunciation;

generating a plurality of phonetic strings comprising said phonetic symbols according to replaceability of said phonetic symbols;

filtering out a portion of said plurality of phonetic strings according to spelling rules of English language, said filtering step comprising the steps of:

filtering out the same phonetic symbols in succession until one thereof is left;

changing n to η if n is followed by k or g;

changing sʃ to ʃ if ʃ is preceded by s, and changing kʃ to tʃ if ʃ is preceded by k;

finding the corresponding letters for each of said phonetic strings; and generating additional phonetic strings, each of said additional phonetic strings having similarity in the phonetic symbols thereamong.

2. The method according to claim 1, wherein said additional phonetic strings are generated by deleting consonants in succession one at a time starting from the second of said phonetic symbols of each of the phonetic strings.

3. The method according to claim 1, wherein said plurality of letters comprise English letters and phonetic alphabets.

4. The method according to claim 3, wherein said English letters and said phonetic alphabets are processed separately.

5. The method according to claim 4, wherein said processing English letters comprises the steps of:

when all of the English letters are consonants, stopping said phonetic spelling check;

deleting all non-English letters and symbols excepts '-';

providing a mapping representing the relationship between the English letters and corresponding symbols, wherein each of said English letters maps to at least one of said symbols;

generating a plurality of letter strings comprising said symbols according to replaceability of said symbols;

filtering out all same vowels in succession until one thereof is left;

changing n to η if n is followed by k or g;

changing sʃ to ʃ if ʃ is preceded by s, and changing kʃ to tʃ if ʃ is preceded by k;

replacing ed by t if the ed locates at the end of the letter string, and is preceded by p, k, S, ʃ, tʃ, θ, and f, otherwise, replacing the ed by d if is not preceded by d or t;

replacing the ed by Id if none of the conditions in the previous step exists;

deleting all null characters in the letter strings;

finding the corresponding English letters for each of the letter strings; and generating additional letter strings by deleting consonants in succession one at a time starting from the second of said symbols of each of the letter strings.

6. The method according to claim 3, further comprising at least a wild card symbol in said plurality of letters.

7. The method according to claim 6, wherein said phonetic alphabets and said wild card symbol are processed separately.

8. The method according to claim 7, wherein said wild card is replaced by a phonetic wild card.

9. A method of phonetic spelling check, comprising:

providing a phonetic mapping representing the relationship between a plurality of letters and corresponding phonetic symbols, wherein each of said plurality of letters maps to at least one of said phonetic symbols, said phonetic mapping being established in accordance with rules of English pronunciation, and said letters including English letters, phonetic alphabets, and wild card symbols;

generating a plurality of phonetic strings comprising said phonetic symbols according to replaceability of said phonetic symbols by separately processing the English letters, the phonetic alphabets, and the wild card symbols; and filtering out a portion of said plurality of phonetic strings according to spelling rules of English language, said filtering step comprising the steps of:

filtering out the same phonetic symbols in succession until one thereof is left;

changing n to η if n is followed by k or g;

changing s∫ to ∫ if ∫ is preceded by s, and changing k∫ to t∫ if is ∫ preceded by k;

finding the corresponding letters for each of said phonetic strings; and generating additional phonetic strings, each of said additional phonetic strings having similarity in the phonetic symbols thereamong.

10. The method according to claim 9, wherein said additional phonetic strings are generated by deleting consonants in succession one at a time starting from the second of said phonetic symbols of each of the phonetic strings.

11. The method according to claim 9, wherein said processing English letters comprises the steps of:

when all of the English letters are consonants, stopping said phonetic spelling check;

deleting all non-English letters and symbols excepts '-';

providing a mapping representing the relationship between the English letters and corresponding symbols, wherein each of said English letters maps to at least one of said symbols;

generating a plurality of letter strings comprising said symbols according to replaceability of said symbols;

filtering out all same vowels in succession until one thereof is left;

changing n to η if n is followed by k or g;

changing s∫ to ∫ if ∫ is preceded by s, and changing k∫ to t∫ if ∫ is preceded by k;

replacing ed by t if the ed locates at the end of the letter string, and is preceded by p, k, s, ∫, t∫, θ, and f, otherwise, replacing the ed by d if is not preceded by d or t;

replacing the ed by Id if none of the conditions in the previous step exists;

deleting all null characters in the letter strings;

finding the corresponding English letters for each of the letter strings; and generating additional letter strings by deleting consonants in succession one at a time starting from the second of said symbols of each of the letter strings.

12. The method according to claim 9, wherein each of said wild card symbols is replaced by a phonetic wild card symbol.

* * * * *